W. E. Marsh, Jr.
Water Closet.
No. 95,597. Patented Oct. 5, 1869.
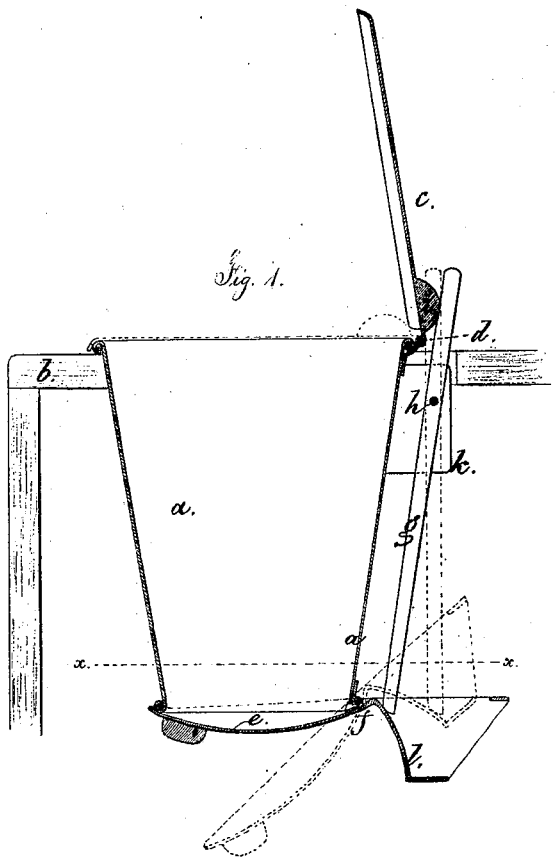
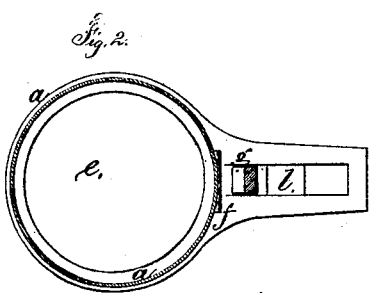
Witnesses
Amos Vail
J. B. Conrard
Wm E. Marsh Jr.

United States Patent Office.

WILLIAM E. MARSH, JR., OF PLAINFIELD, NEW JERSEY.

Letters Patent No. 95,597, dated October 5, 1869.

IMPROVEMENT IN WATER-CLOSETS FOR RAILROAD-CARS.

The Schedule referred to in these Letters Patent and making part of the same

*To all whom it may concern:*

Be it known that I, WILLIAM E. MARSH, Jr., of Plainfield, in the county of Union, and State of New Jersey, have invented and made a new and useful Improvement in Closets or Privies for Railroad-Cars, Steamboats, &c.; and I do hereby declare the following to be a full, clear, and exact description of the said invention, reference being had to the annexed drawing, making part of this specification, wherein—

Figure 1 is a vertical section of the said closet, and
Figure 2 is a plan below the line $x\ x$.

Similar marks of reference denote the same parts.

In the closets or privies of railroad-cars, the cold and wind, especially while the train is in motion, are very disagreeable, and on vessels, the privies that are provided on the guards or bows are exposed to dashes of water passing up into them, even while in use.

My invention is to remove these objectionable features, by providing a pan at the bottom of the hopper, connected with a lid at the top of said hopper, in such a manner that the closing of the lid opens or drops the pan for the delivery of the contents, and the raising of the lid closes the bottom of the hopper by the said pan, thus rendering closets or privies in exposed situations unobjectionable, and free from danger of cold to delicate or sickly persons.

My invention is also applicable to spittoons for railway-cars.

In the drawing—

$a$ is a hopper of convenient size and shape, and $b$ represents the seat or other wood-work to which the hopper is attached.

At the upper end of the hopper is the lid or cover $c$, hinged at $d$, and $e$ is the pan of the closet, united to the hopper by a hinge at $f$.

$g$ is a lever on a fulcrum, $h$, between flanges $k$ on the hopper $a$, and the upper end of this lever is contiguous to the hinge $d$, and a cam-projection, $i$, upon said lid $c$, operates this lever $g$ as the lid is raised.

At the back portion of the pan $e$ is a cam-shaped tail-piece, $l$, into which the lower end of the lever $g$ passes.

In fig. 1, the cam $i$ is shown as in contact with the upper end of the lever $g$, the lid $c$ open, and the pan $e$ closed by the action of the lower end of the lever $g$ on the tail-piece $l$.

When the lid $c$ is closed, the parts assume the position shown by dotted lines, so that the contents of the pan $e$ may fall away.

What I claim, and desire to secure by Letters Patent, is—

The hinged lid $c$ and cam $i$, in combination with the hopper $a$, pan $e$, and cam tail-piece $l$, substantially as and for the purposes set forth.

In witness whereof, I have hereunto set my signature, this 2d day of July, A. D. 1869.

WM. E. MARSH, Jr.

Witnesses:
AMOS VAIL,
J. B. COWARD.